(12) United States Patent
Kim et al.

(10) Patent No.: US 9,783,059 B2
(45) Date of Patent: Oct. 10, 2017

(54) HIGH VOLTAGE SHUT DOWN SYSTEM AND METHOD FOR ELECTRIC VEHICLE

(71) Applicant: Hyundai Motor Company, Seoul (KR)

(72) Inventors: Do Hoon Kim, Seoul (KR); Zeung Il Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 40 days.

(21) Appl. No.: 14/711,422

(22) Filed: May 13, 2015

(65) Prior Publication Data

US 2015/0360569 A1  Dec. 17, 2015

(30) Foreign Application Priority Data

Jun. 17, 2014 (KR) ........................ 10-2014-0073220

(51) Int. Cl.
| | |
|---|---|
| *B60L 11/18* | (2006.01) |
| *B60R 21/0136* | (2006.01) |
| *B60L 3/00* | (2006.01) |
| *B60R 21/01* | (2006.01) |

(52) U.S. Cl.
CPC ......... *B60L 3/0007* (2013.01); *B60L 11/1809* (2013.01); *B60R 21/0136* (2013.01); *B60R 2021/01286* (2013.01); *Y02T 10/7005* (2013.01)

(58) Field of Classification Search
None
See application file for complete search history.

(56) References Cited

U.S. PATENT DOCUMENTS

| | | | | |
|---|---|---|---|---|
| 6,185,490 B1 * | 2/2001 | Ferguson | ............ | G07C 5/0858 369/21 |
| 7,671,567 B2 | 3/2010 | Eberhard et al. | | |
| 2004/0138794 A1 * | 7/2004 | Saito | ............... | G01M 15/04 701/32.6 |
| 2005/0284436 A1 * | 12/2005 | Takezoe | ............... | F02N 11/101 123/179.2 |
| 2011/0242722 A1 * | 10/2011 | Yamada | ................ | F23N 5/245 361/166 |
| 2014/0174844 A1 * | 6/2014 | Nakai | ................ | B62D 5/0481 180/446 |

(Continued)

FOREIGN PATENT DOCUMENTS

| | | | |
|---|---|---|---|
| EP | 1609985 A2 * | 12/2005 | |
| JP | GB 2265240 A * | 9/1993 | ............ B60L 3/0007 |

(Continued)

*Primary Examiner* — Jean-Paul Cass
(74) *Attorney, Agent, or Firm* — Mintz Levin Cohn Ferris Glovsky and Popeo, P.C.; Peter F. Corless (57) ABSTRACT

A high voltage shut down system and method for an electric vehicle are provided, which perform a high voltage shut down function in connection with a collision detection signal (airbag expansion signal) generated from an airbag controller even when a vehicle is being charged. The high voltage shut down system a third power supply controller which is in an operable state for transmitting power when the vehicle starts and is charged. An airbag control unit is operated by receiving power through the third power supply controller, and is configured to generate an airbag expansion signal when detecting an occurrence of a collision of the vehicle. A high voltage controller is configured to perform a high voltage shut down function in response to receiving the airbag expansion signal.

13 Claims, 4 Drawing Sheets

(56) References Cited

U.S. PATENT DOCUMENTS

2015/0057865 A1\*  2/2015  Stadler ................. B60L 3/0007
                                                    701/22
2015/0115740 A1\*  4/2015  Miura .................... H01H 47/00
                                                    307/117

FOREIGN PATENT DOCUMENTS

| JP | 2011-087408 A | 4/2011 |
| JP | 2011-217544 A | 10/2011 |
| JP | 2013-542704 A | 11/2013 |
| KR | 2002-0069543 A | 9/2002 |
| KR | 10-2010-0004013 A | 1/2010 |
| KR | 2012-0126852 A | 11/2012 |
| KR | 2013-0067886 A | 6/2013 |
| KR | 2013-0071923 A | 7/2013 |

\* cited by examiner

FIG.5

HIGH VOLTAGE SHUT DOWN SYSTEM AND METHOD FOR ELECTRIC VEHICLE

CROSS-REFERENCE TO RELATED APPLICATION(S)

Pursuant to 35 U.S.C. §119(a), this application claims priority to Korean Patent Application No. 10-2014-0073220, filed on Jun. 17, 2014, the entire contents of which are incorporated herein by reference.

BACKGROUND

Technical Field

The present disclosure relates to a high voltage shut down system and method for an electric vehicle and more particularly, relates to a high voltage shut down system and method for an electric vehicle, which shuts down a high voltage when a collision occurs while charging, to improve stability of the vehicle.

Discussion of Related Art

Currently, when a collision occurs during an ignition-on state and an operation ready state of a vehicle, a high voltage shut down function is performed for safety reasons, and for example, a high voltage relay is turned off when an airbag expansion signal is generated by recognizing information regarding a collision of an airbag controller (ACU). However, since rapid or slow charging is performed in a key-off state of the vehicle, the high voltage shut down function is not performed even when a collision of the vehicle occurs, since in the key-off situation, power is not applied to the ACU.

In consideration of a time required for the general substantially rapid (e.g., 25 to 30 minutes) and substantially slow (e.g., 5 to 8 hours) charging of an electric vehicle and the number of times a vehicle is charged (e.g., once per day), a safety strategy for dealing with a collision situation while charging is desired. A vehicle fire may occur due to high voltage series disconnection within the vehicle, furthermore injuries to humans may occur due to momentary inflow of a high current into the vehicle when a collision occurs while charging. Accordingly, a safety strategy for dealing with a collision situation while charging is desirable.

The above information disclosed in this background section is only for enhancement of understanding of the background of the invention and therefore it may contain information that does not form the prior art that is already known in this country to a person of ordinary skill in the art.

SUMMARY

The present invention provides a high voltage shut down system and method for an electric vehicle, which may be configured to perform a high voltage shut down function in connection with a collision detection signal (e.g., an airbag expansion signal) generated by an airbag controller when a vehicle is being charged, as well as upon starting the vehicle.

In one aspect, the present invention provides a system for shutting down a high voltage for an electric vehicle, which may include a collision detection unit configured to detect a collision that occurs while charging a vehicle and a high voltage controller configured to perform a high voltage shut down function when a collision is detected by the collision detection unit, (i.e., when receiving a collision detection signal of the collision detection unit). The system may further include a third power supply controller configured to transmit operative power to the collision detection unit when the vehicle is charged, a first power supply controller configured to transmit power when the vehicle starts, an airbag operated by power received through the first power supply controller; and an event data recorder (EDR) operated by power received through the first power supply controller.

In an exemplary embodiment, the third power supply controller may be connected with a battery charger, and may be configured to receive power from the battery charger when the vehicle is charged and in an operable state. The the collision detection unit may include an airbag controller configured to generate an airbag expansion signal in response to detecting a collision of the vehicle. More particularly, the third power supply controller may be configured to receive power through a third power supply relay which may be activated (e.g., turned on) by a battery charger to be operated when the vehicle is charged. In addition, the third power supply controller may be configured to receive power through the third power supply relay when the vehicle starts, and the third power supply relay may be activated and operated by a first power supply relay which may be activated and operated when the vehicle starts.

The first power supply relay may be activated when the vehicle starts to activate the third power supply relay and supply power to a first power supply controller. The airbag and the EDR may be connected to a first power supply controller when the vehicle starts, and may be selectively connected to a third power supply controller while the vehicle is being charged. The system may further include a rear collision detection unit configured to detect an occurrence of a rear collision of the vehicle while the vehicle is being charged. When the rear collision detection unit detects a rear collision, the high voltage controller may be configured to perform a high voltage shut down function. In particular, the rear collision detection unit may be configured to receive operative power by a third power supply controller to be operable when the vehicle is charged.

In another aspect, the present invention provides a method of shutting down a high voltage for an electric vehicle. The method may include: operating a third power supply controller via a battery charger when a vehicle is charged; supplying power to an airbag control unit through the third power supply controller; and performing, by a high voltage controller, a high voltage shut down function in connection with an airbag expansion signal being generated when the airbag control unit detects a collision of the vehicle.

In an exemplary embodiment, an airbag and an EDR may not be connected to the third power supply controller and therefore may not be operated when the airbag expansion signal is generated, or an airbag and an EDR may be connected to the third power supply controller and operated in connection with the generation of the airbag expansion signal. In addition, a first power supply controller may be operable together with the third power supply controller when the vehicle starts, and a high voltage shut down function may be performed, and simultaneously an airbag and an EDR may be configured to receive power through the first power supply controller when the airbag expansion signal is generated.

Through the aforementioned technical solutions, the present invention provides the effects below. According to the present invention, it may be possible to secure a safety strategy in case of a collision situation by performing a high voltage shut down function while a vehicle is being charged, as well as during an ignition (e.g., IG ON) situation and during an operation ready situation of the vehicle, and reduce a likelihood or prevent a vehicle fire or injury to a human by preventing high voltage series disconnection within the vehicle and momentary inflow of a high current into the vehicle when a collision occurs while the vehicle is being charged.

As will be understand, references herein to "high voltage" generally will indicate a voltage of about 120V to 500 V depending on the charging state of the vehicle.

BRIEF DESCRIPTION OF THE DRAWINGS

The above and other objects, features and other advantages of the present invention will be more clearly understood from the following detailed description when taken in conjunction with the accompanying drawings, in which.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Hereinafter, the present invention will be described so that those skilled in the art may easily implement the present invention. As is well known, a quantity of momentary current consumption is substantial when a vehicle starts, so that it may be difficult for a battery (regular power supply) to handle all of the electronic loads. Accordingly, a power supply of the vehicle may include a first ignition power supply (IG1 power supply) and a second ignition power supply (IG2 power supply), and the first ignition power supply may be used as a power supply for starting the vehicle, a chassis controller, and the like, and the second ignition power supply may be used as a power supply of a body controller (a full automatic temperature control (FATC), a wiper, and the like) and the like. The aforementioned mechanism is equally applied to an electric vehicle. In other words, a power supply of an electric vehicle may include a first ignition power supply and a second ignition power supply.

As is known, since an electric vehicle is charged in a key-off state, power needs to be supplied to controllers related to the charging. The present invention may perform a high voltage shut down function in connection with a collision detection signal (e.g., an airbag expansion signal) generated from an airbag controller (ACU) while a vehicle is being charged as well as during starting of the vehicle, thereby securing stability of the vehicle.

Figure 1:
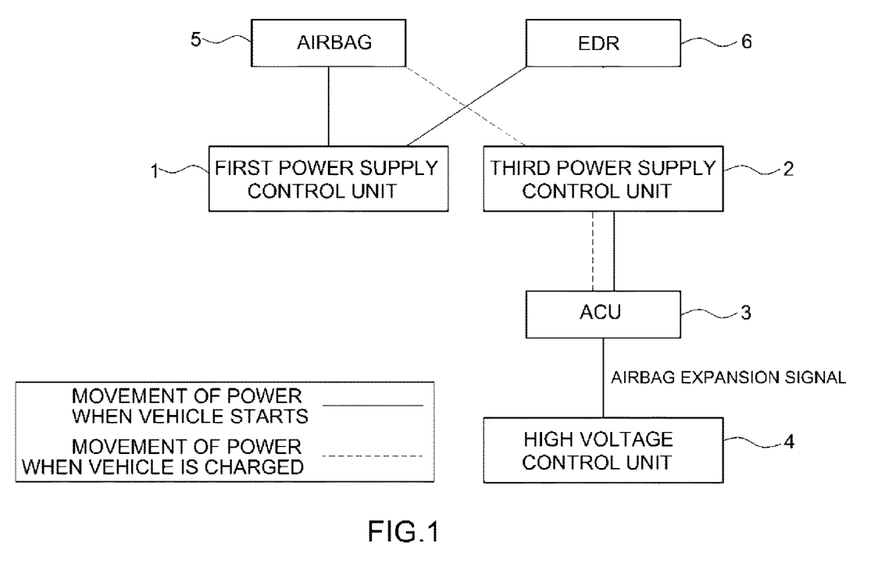
FIG. 1 is an exemplary diagram illustrating a configuration of a shut down system for an electric vehicle according to an exemplary embodiment of the present invention.

As illustrated in FIG. 1, a high voltage shut down system for an electric vehicle according to the present invention may include a first power supply controller 1, a third power supply controller 2, an airbag controller 3, a high voltage controller 4, an airbag 5, and an event data recorder (EDR) 6. Such elements may be configured to be operated by a controller (not shown).

Figure 2:
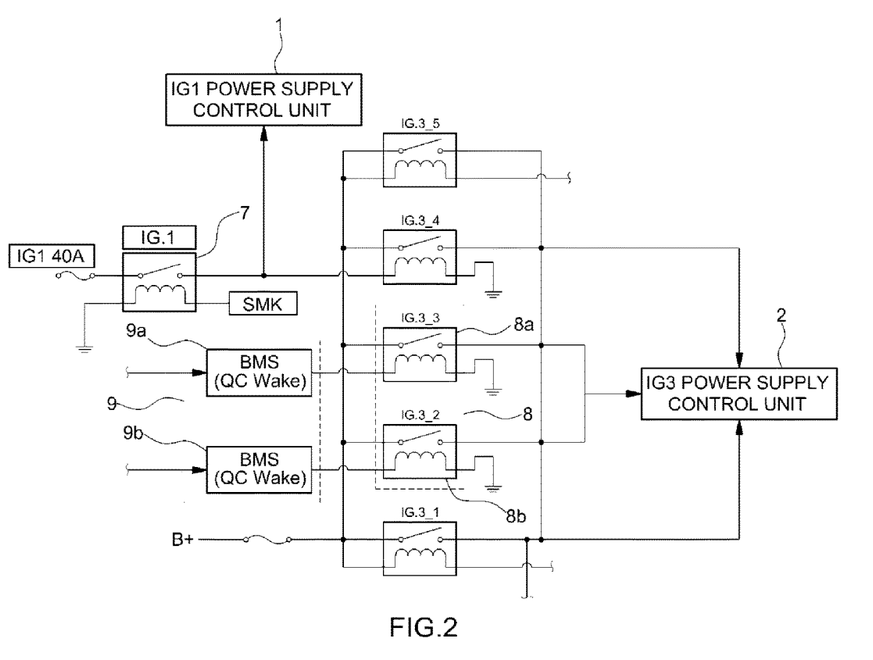
FIG. 2 is an exemplary diagram illustrating a movement of power of the high voltage shut down system for an electric vehicle according to an exemplary embodiment of the present invention.

The first power supply controller 1 may be configured to receive power when the vehicle starts to be in an operable state for transmitting power to the airbag 5, the EDR 6, and the like. As illustrated in FIG. 2, when the electric vehicle starts using a start button, a first power supply relay 7 connected to the first power supply controller 1 may be activated by an operation of a smart key (SMK) controller, to cause the first power supply controller 1 to receive power, and a third power supply relay 8 connected to the third power supply controller 2 may be activated in connection with the operation of the first power supply relay 7, to supply power to the third power supply controller 2. In other words, when the vehicle starts, the first power supply controller 1 and the third power supply controller 2 may be configured to simultaneously receive power to be in an operable state. The third power supply controller 2 may be configured to enter the operable state for transmitting power to the airbag controller 3 when the vehicle is charged.

As illustrated in FIG. 2, the third power supply relay 8 may be activated using a battery charger 9, such as a battery management system (BMS) 9a for rapidly charging the battery and an on board charger (OBC) 9b for slowly charging the battery, so that the third power supply controller 2 may receive power. The third power supply relay 8 may be connected to the battery charger 9 and may be activated and may enter an operation state using the battery charger 9 while charging. Particularly, the third power supply controller 2 may be configured to receive power through an operation of the relay 8a connected to the BMS 9a during rapid charging, and receive power through an operation of the relay 8b connected to the OBC 9b during the slow charging. In other words, power may be supplied to the third power supply controller 2 connected to the third power supply relay 8 during charging of the vehicle, to cause the third power supply controller 2 receiving the power to enter operable state.

The third power supply controller 2 may be connected to a power supply system capable of initiating the airbag controller 3 while charging, to operate the airbag controller 3 may be operated while the vehicle is being charged, to detect the occurrence of the collision of the vehicle. The airbag controller 3 may include a collision detection unit configured to detect a collision occurring while the vehicle is charged, and may be connected to the third power supply controller 2 and operated by receiving power through the third power supply controller 2 when the vehicle starts and is charged, and generate an airbag expansion signal (collision detection signal) when detecting the occurrence of the collision of the vehicle and transmit the generated airbag expansion signal to the high voltage controller 4.

The high voltage controller 4 may be configured to perform the high voltage shut down function when receiving the airbag expansion signal of the airbag controller 3, and may include a battery management system (BMS) or a vehicle controller (VCU). The airbag 5 may be connected to the first power supply controller 1 and may be configured to receive power through the first power supply controller 1 when the vehicle starts. The airbag 5 may be selectively connected to the third power supply controller 2 while the vehicle is charged, to allow the airbag 5 to receive power through the third power supply controller 2 when being connected to the third power supply controller 2 to be operable.

The EDR 6 may be configured to perform a function of storing vehicle state information within the airbag controller 3 when the airbag 5 is expanded. Similar to the airbag 5, the EDR 6 may be connected to the first power supply controller 1 and may be configured to receive power through the first power supply controller 1 when the vehicle starts. The EDR 6 may be selectively connected to the third power supply controller 2 while the vehicle is charged, to cause the EDR 6 to receive power through the third power supply controller 2 when being connected to the third power supply controller 2 to be operable.

Although not illustrated in the figured, to supplement the collision detection function of the airbag controller 3, a rear collision detection unit (not illustrated) configured to detect a rear collision of the vehicle occurring while the vehicle is being charged may be included, and the rear collision detection unit may be configured to receive power of the battery charger 9 via the third power supply controller 2 (similar to the airbag controller 3) to be operable. When the rear collision detection unit detects a rear collision, the high voltage controller 4 may be configured to receive a collision detection signal from the rear collision detection unit to perform the high voltage shut down function.

Figure 3:
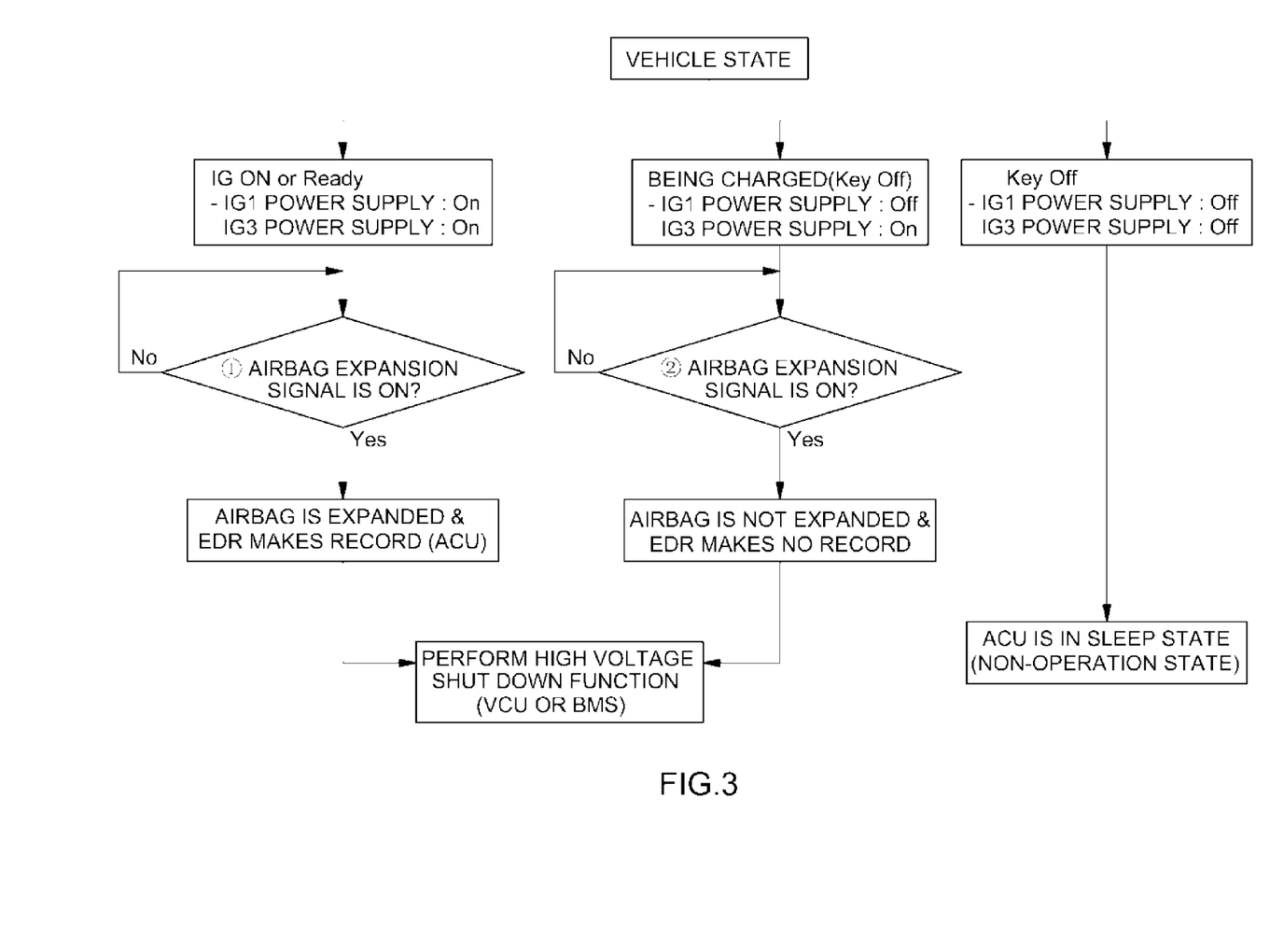
FIG. 3 is an exemplary flowchart illustrating a high voltage shut down method for an electric vehicle according to an exemplary embodiment of the present invention.
Figure 4:
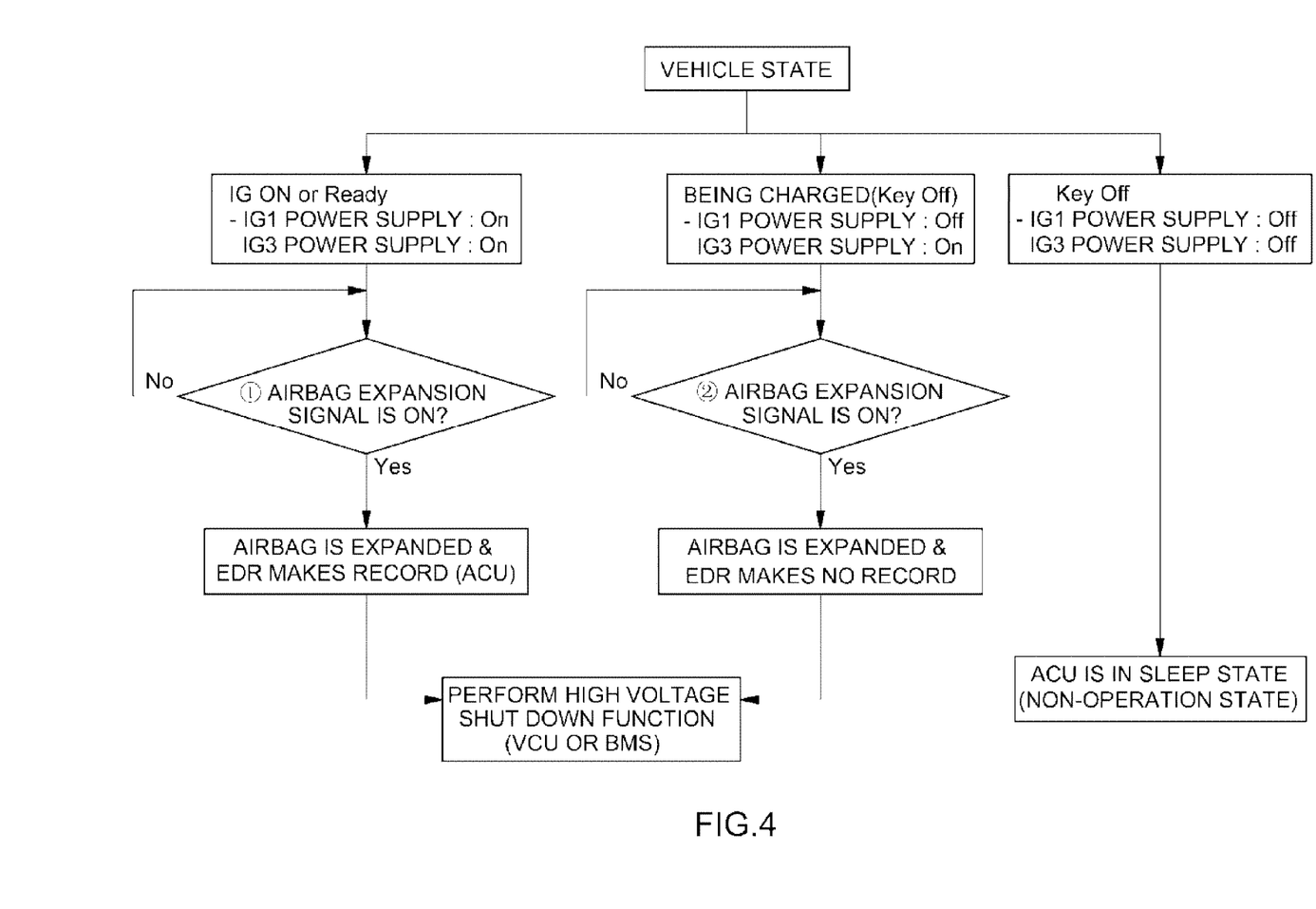
FIG. 4 is an exemplary flowchart illustrating a high voltage shut down method for an electric vehicle according to another exemplary embodiment of the present invention.
Figure 5:
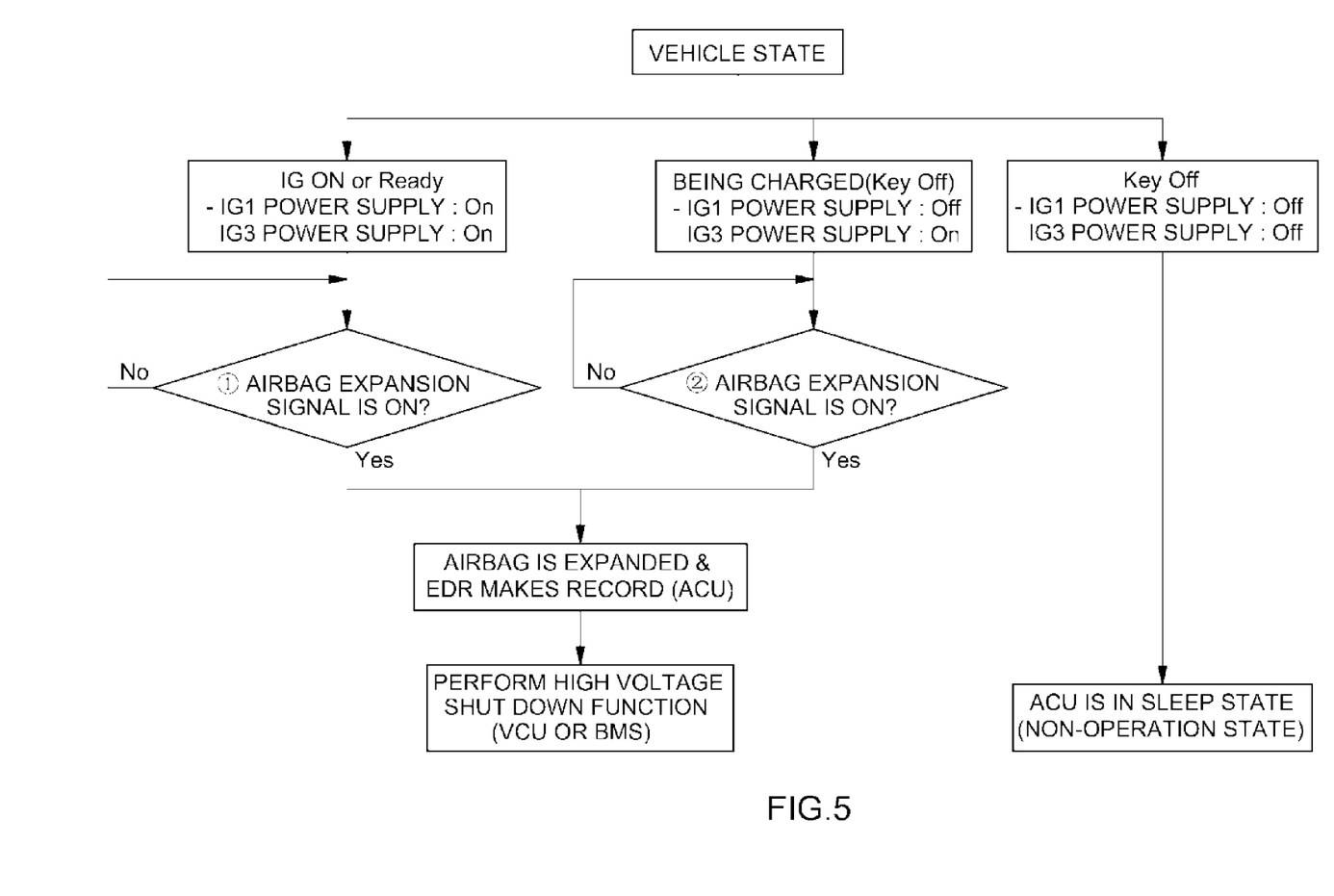
FIG. 5 is an exemplary flowchart illustrating a high voltage shut down method for an electric vehicle according to yet another exemplary embodiment of the present invention.

FIGS. 3 to 5 are exemplary flowcharts illustrating a high voltage shut down method for an electric vehicle according to exemplary embodiments of the present invention, respectively. Hereinafter, a process of shutting down a high voltage at a time of a collision when a vehicle start and is charged will be described with reference to FIGS. 3 to 5. Referring to FIG. 3, when a vehicle starts, such as an ignition on (IG ON) state or an operation ready state, the first power supply controller 1 and the third power supply controller 2 may be activated to operate the vehicle. When a collision of the vehicle occurs during an ignition on or an operation ready situation, an airbag expansion signal may be generated by the airbag controller 3, and the high voltage controller 4 receiving the airbag expansion signal may be configured to perform a high voltage shut down function. In particular, the airbag 5 and the EDR 6 connected to the first power supply controller 1 to receive power may be operated, causing the airbag 5 to be expanded, and the EDR 6 may be configured to store vehicle state information within the airbag controller 3.

When the vehicle is charged, the first power supply controller 1 may be turned off to be inoperable, and the third power supply controller 2 may be activated (e.g., turned on) to be operable. When a collision occurs during the charging state of the vehicle, the airbag expansion signal may be generated by the airbag controller 3, and the high voltage controller 4 receiving the airbag expansion signal may be configured to perform the high voltage shut down function. Since the first power supply controller 1 is in a non-operation state, the airbag 5 and the EDR 6 may not be operated (e.g., the airbag is not expanded, and the EDR does not make a record). When the collision occurs during the key-off state of the vehicle, the airbag controller 3 may be in a sleep state and may not be operated.

Referring to FIG. 4, when the airbag 5 is connected to the third power supply controller 2 and the EDR is not connected to the third power supply controller 2 when the vehicle is charged, the airbag 5 may be in a wake-up state, but the EDR 6 may not be in the wake-up state, so that when the airbag expansion signal is generated by the airbag controller 3, the airbag 5 may be operated to be expanded, but the EDR 6 may not be operated (e.g., does not make a record). Referring to FIG. 5, the airbag 5 and the EDR 6 may be connected to the third power supply controller 2 when the vehicle is charged, so that when the airbag expansion signal is generated by the airbag controller 3, the airbag 5 may be expanded, and the EDR 6 may store vehicle state information according to the occurrence of the collision within the airbag controller 3.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A system for shutting down a high voltage for an electric vehicle, comprising:
    a memory configured to store program instructions;
    a first power supply controller electrically connected to a first power supply relay;
    a second power supply controller electrically connected to a second power supply relay activated in connection with an operation of the first power supply relay to supply power to the second power supply controller;
    a battery charger electrically connected to the second power supply controller via the second power supply relay such that the second power supply controller is activated using the battery charger;
    a collision detection unit electrically connected to the third power supply controller;
    a high voltage controller electrically connected to the collision detection unit; and
    a controller configured to execute the program instructions, the program instructions when executed configured to:
    operate the collision detection unit configured to detect a collision occurring while charging a vehicle; and
    operate the high voltage controller configured to shut down a first voltage when a collision is detected by the collision detection unit, and
    wherein the program instructions when executed are further configured to:
    operate the first power supply controller which becomes operable for transmitting power when the vehicle starts;
    operate an airbag configured to receive power via the first power supply controller; and
    operate an event data recorder (EDR) configured to receive power via the first power supply controller, and
    wherein the airbag is connected to the first power supply controller when the vehicle starts, and is selectively connected to the second power supply controller while the vehicle is being charged.

2. The system of claim 1, wherein the program instructions when executed are further configured to:
    operate the second power supply controller configured to transmit operative power to the collision detection unit when the vehicle is charged.

3. The system of claim 2, wherein the second power supply controller is configured to receive power from the battery charger when the vehicle is charged and in an operable state.

4. The system of claim 1, wherein the collision detection unit includes an airbag control unit configured to generate an airbag expansion signal when detecting a collision of the vehicle.

5. The system of claim 2, wherein the second power supply controller is configured to receive power through the second power supply relay which is configured to be activated by the battery charger to be operated when the vehicle is charged.

6. The system of claim 2, wherein the second power supply controller is configured to receive power through the second power supply relay when the vehicle starts, and the second power supply relay is configured to be activated and operated by the first power supply relay which is activated and operated when the vehicle starts.

7. The system of claim 6, wherein the first power supply relay is activated when the vehicle starts to activate the second power supply relay and supply power to the first power supply controller.

8. The system of claim 1, wherein the EDR is connected to the first power supply controller when the vehicle starts, and is selectively connected to the second power supply controller while the vehicle is being charged.

9. The system of claim 1, further comprising:
    a rear collision detection unit configured to detect a rear collision of the vehicle occurring while the vehicle is being charged,
    wherein when the rear collision detection unit detects a rear collision, the high voltage controller shuts down a first voltage.

10. The system of claim 9, wherein the rear collision detection unit receives operative power by the second power supply controller to be operable when the vehicle is charged.

11. A method of shutting down a high voltage for an electric vehicle, comprising:
    operating, by a controller, a second power supply controller through a battery charger when a vehicle is charged;
    operating, by the controller, the second power supply controller to supplying power to an airbag controller; and
    operating, by the controller, a high voltage controller, to shut down a first voltage in connection with an airbag expansion signal generated when the airbag controller detects a collision of the vehicle,
    wherein the second power supply controller is electrically connected to a second power supply relay; and the second power supply relay is electrically connected to the battery charger such that the second power supply controller is electrically connected to the battery charger and activated using the battery charger, and
    wherein a first power supply controller is operable together with the second power supply controller when the vehicle starts, the method further comprising:
    shutting down, by the first power supply controller, a first voltage; and
    operating, by the first power supply controller, an airbag and an EDR using power received through the first power supply controller when the airbag expansion signal is generated.

12. The method of claim 11, wherein an airbag and an event data recorder (EDR) are disconnected to the second power supply controller and are inactivated when the airbag expansion signal is generated.

13. The method of claim 11, wherein an airbag and an EDR are connected to the second power supply controller, the method further comprises:
   operating, by the controller, the second power supply controller in response to the airbag expansion signal.

* * * * *